(12) United States Patent
Valdez et al.

(10) Patent No.: US 8,475,855 B2
(45) Date of Patent: Jul. 2, 2013

(54) CONFECTIONERY PRODUCT

(75) Inventors: Monica C. Valdez, Columbus, OH (US);
Adrienne D. Holmes, Marysville, OH (US); John David Wood, Delaware, OH (US); Marcel Aebi, Dublin, OH (US); Sandhya Sridhar, Dublin, OH (US)

(73) Assignee: Nestec S.A., Vevey (CH)

( * ) Notice: Subject to any disclaimer, the term of this patent is extended or adjusted under 35 U.S.C. 154(b) by 895 days.

(21) Appl. No.: 12/345,066

(22) Filed: Dec. 29, 2008

(65) Prior Publication Data
US 2010/0166922 A1 Jul. 1, 2010

(51) Int. Cl.
*A23G 4/20* (2006.01)
(52) U.S. Cl.
USPC .......................................... 426/103; 426/660
(58) Field of Classification Search
USPC .......................................... 426/102, 103, 660
See application file for complete search history.

(56) References Cited

U.S. PATENT DOCUMENTS

| | | | | |
|---|---|---|---|---|
| 4,874,618 A * | 10/1989 | Seaborne et al. | ............... | 426/76 |
| 4,963,379 A * | 10/1990 | Ferrero | ............................ | 426/93 |
| 5,352,111 A * | 10/1994 | Selbak | ........................ | 425/351 |
| 6,849,289 B2 * | 2/2005 | Lefebvre et al. | ............. | 426/660 |
| 2003/0003214 A1 * | 1/2003 | Kraklow et al. | ............... | 426/551 |
| 2007/0104828 A1 * | 5/2007 | Fornaguera | ....................... | 426/3 |
| 2008/0050484 A1 * | 2/2008 | Kijowski et al. | ............. | 426/303 |

FOREIGN PATENT DOCUMENTS

| | | | |
|---|---|---|---|
| EP | 1040763 A1 * | 10/2000 | |
| WO | WO 2005002352 A1 * | 1/2005 | |

OTHER PUBLICATIONS

Bush et al., Skuse's complete confectioner, 1957, Published by J.W. Bush & Company Ltd., pp. 96-97.*

* cited by examiner

*Primary Examiner* — Jyoti Chawla
(74) *Attorney, Agent, or Firm* — K&L Gates LLP

(57) ABSTRACT

A confectionery product comprises first and second confectionery mass layers arranged in contact with each other as a laminate. At least one of the inner surfaces of the first and second confectionery mass layers is provided with at least one depression, and preferably a plurality of depressions arranged in a regular two-dimensional array. The inner surfaces of the confectionery mass layers define at least one pocket in the confectionery product, the or each pocket being located in an area corresponding to a respective depression. The pockets may provide aeration on a macro scale, and they may be at least partially filled with a liquid, semi-solid or solid material.

17 Claims, 4 Drawing Sheets

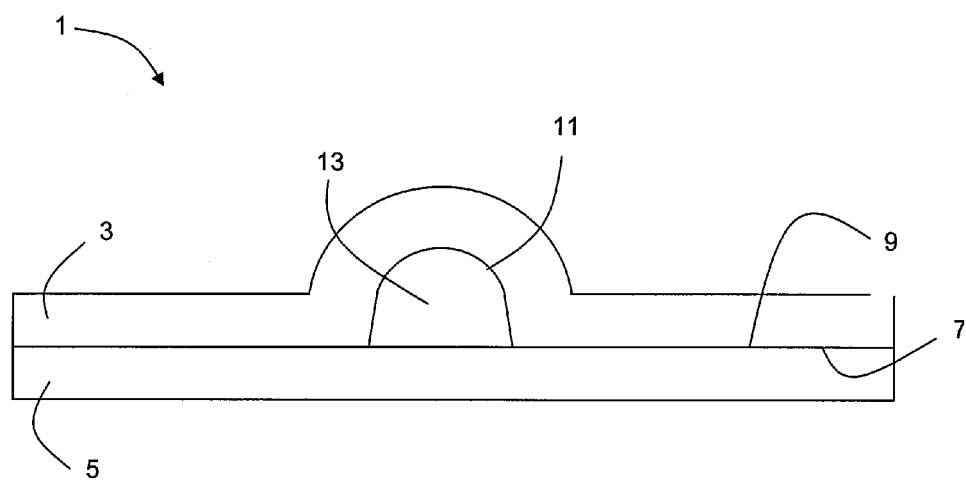
Fig. 1
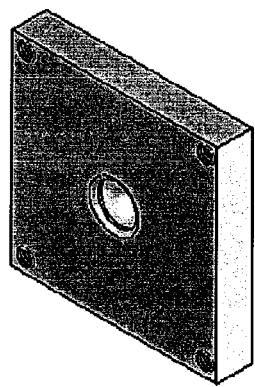 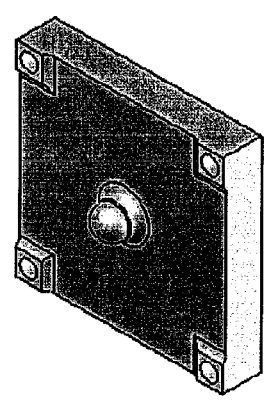
Fig. 2A              Fig. 2B

CONFECTIONERY PRODUCT

BACKGROUND

This invention relates to confectionery products in which solid or semi-solid confectionery masses are provided with a large number of small pockets. These pockets may contain trapped gas, such as air, or liquid, semi-solid or solid materials. Products having air pockets are generally known as aerated confectionery products. This invention also relates to methods for producing such products.

SUMMARY

In a conventional aerated confectionery product, a confectionery mass is provided with randomly distributed pockets of air. The production process for such a product typically comprises a step of mechanically whipping the heated confectionery mass in a liquid (or semi-solid) state to introduce a volume of air in the form of pockets into the structure of the confectionery mass. The pockets of air in the heated confectionery mass are usually unstable, the confectionery mass then being solidified (or semi-solidified) by cooling to stabilize the pockets of air. Other known aeration techniques, such as vacuum aeration and induced aeration using sodium bicarbonate, may be used to similar effect.

Aerated confectionery products made by the above-described known production process typically have a lower density than non-aerated confectionery products. Depending on the nature of the product, this lower density can provide an improved product texture, an improved sensory experience for the consumer and/or more efficient production of the product.

Although conventional aerated confectionery products are adequate in many respects, there are certain limitations on the extent to which their properties can be varied. Many of these limitations relate to the production processes by which the conventional products are made. For example, there are limitations on the sizes and the distribution of air pockets that can be obtained.

Various types of confectionery masses are suitable for use in conventional aerated products. These include fat-based confectionery masses, such as chocolate, and non-fat based confectionery masses such as high-boiled sugar masses, taffy masses, fruit leathers, caramels and nougats.

It is an object of the invention to provide improved aerated-type confectionery products. It is a further object of the invention to provide improved methods for producing such products.

According to a first aspect of the invention, there is provided a confectionery product comprising first and second confectionery mass layers arranged in contact with each other as a laminate, wherein at least one of the inner surfaces of the first and second confectionery mass layers is provided with at least one depression, whereby the inner surfaces of the confectionery mass layers define at least one pocket in the confectionery product, the or each pocket being located in an area corresponding to a respective depression. The pockets may be air filled, or they may be at least partially filled with a liquid, semi-solid or solid confectionery material.

Where the pockets are air filled, the first aspect of the invention provides a confectionery product having what can be described as macro-scale aeration. The macro-scale aeration may be provided instead of, or in addition to, conventional micro-scale aeration such as aeration induced by mechanical whipping.

Unlike the aeration in known aerated confectionery products, the macro-scale aeration provided by the invention can be accurately and repeatably arranged in predetermined locations. Furthermore, pockets of air having predetermined dimensions and volumes can be accurately and repeatably provided.

The macro-scale aeration provided by the invention may allow for more diverse sensory experiences for the consumer than are possible with known aerated confectionery products.

Where the confectionery mass layer formed with the at least one depression is in the form of a thin sheet, the confectionery product of the invention may also provide a distinctive visual appearance, since the depressions formed in the inner surface of the sheet will be translated to the outer surface of the sheet as visible protrusions.

In preferred embodiments, the first and second confectionery mass layers consist of the same ingredients, although it is also within the scope of the invention to provide arrangements in which the layers are formed of dissimilar confectionery masses. In general, it is preferred that the confectionery mass layers are inherently "sticky" under normal processing conditions, to avoid delamination of the layers, and to avoid any leakage from the pockets. The latter consideration may be particularly important where the pockets are filled with a liquid or semi-solid material.

Suitable confectionery masses for the confectionery mass layers include high-boiled sugar masses, taffy masses, fruit leathers, caramels, nougats and chocolate. These confectionery masses have been found to be sufficiently flexible, under appropriate conditions of heat and pressure, for stable depressions to be formed in the layer without rupturing or tearing the layer.

In a particularly preferred embodiment, the first and second confectionery mass layers are each formed of a high-boiled toffee-flavoured sugar mass, the sugar mass comprising from 70 to 90 wt % of sugars, from 10 to 20 wt % of dairy products, from 0.05 to 0.15 wt % of an emulsifier, and from 0.01 to 0.05 wt % of salt.

The first and second confectionery mass layers may include sodium bicarbonate-induced aeration. It has been found that such aeration, induced by including from 1 to 5 wt % of sodium bicarbonate in the confectionery mass layers during mixing of the ingredients, may provide a product with reduced "tooth packing" characteristics, while at the same time maintaining a desirable texture. Sodium bicarbonate-induced aeration has been found to be particularly advantageous in relation to confectionery mass layers comprising high-boiled sugar masses, such as the toffee-flavoured sugar mass described above.

In embodiments in which the pockets are at least partially filled with a liquid, semi-solid or solid material, the filling may be selected to provide a contrasting taste and/or texture to that of the confectionery mass layers.

In embodiments having a plurality of pockets, the pockets may be arranged in a regular, two-dimensional array, such as a regular grid of pockets. In this case, the depressions may define an area of at least 40%, preferably at least 50%, and more preferably at least 60%, of the total area of the or each layer of the first and second confectionery mass layers in which the depressions are formed.

The or each pocket may be substantially semispherical in shape, with a diameter in the range 2 mm to 30 mm, preferably in the range 4 mm to 25 mm and more preferably in the range 6 mm to 20 mm. Where depressions are formed in both of the inner surfaces of the first and second confection mass layers, the or each pocket may be substantially spherical in shape.

According to a second aspect of the invention, a method is provided for producing a confectionery product, the method comprising the steps of: providing first and second confectionery mass layers; forming at least one depression in at least one surface of the first and second confectionery mass layers; and joining the first and second confectionery mass layers together in a laminar arrangement, such that the at least one depression is arranged in an inner surface of the first and second confectionery mass layers, the inner surfaces of the confectionery mass layers defining at least one pocket in the confectionery product, the or each pocket being located in an area corresponding to a respective depression.

The second aspect of the invention provides a production method for the confectionery product of the first aspect. Thus, where the pockets are air filled, the second aspect of the invention provides aeration which can be described as macro-scale aeration. The macro-scale aeration may be provided instead of, or in addition to, conventional micro-scale aeration such as aeration induced by mechanical whipping.

The step of providing the first and second confectionery mass layers may comprise heating at least one of the first and second confectionery mass layers. In general, heating confectionery masses improves their formability.

Where the first and second confectionery mass layers are heated, the method may further comprise the subsequent step of cooling the laminar arrangement. Cooling generally improves the stability of the confectionery masses, so that the pockets are stabilized.

The step of providing the first and second confectionery mass layers may also comprise inducing aeration in at least one of the first and second confectionery layers using from 1 to 5 wt % of sodium bicarbonate. Such micro-scale aeration may not only improve the formability of confectionery masses, but may also reduce the "tooth packing" characteristics of the final product.

The step of providing the first and second confectionery mass layers may comprise forming at least one of the first and second confectionery mass layers into sheets. Confectionery products produced in this way may have a distinctive visual appearance, since the depressions formed in the inner surface of the sheet will be translated to the outer surface of the sheet as visible protrusions.

The step of forming the at least one depression in at least one surface of the first and second confectionery mass layers may comprise forming the at least one depression using stamp moulding, drop-roll forming, vacuum-assisted drop roll forming or vacuum moulding. Other suitable forming techniques will be readily apparent to those of ordinary skill in the art. Edible oils such as vegetable oils may be used as a lubricant during the forming of the at least one depression.

The method may comprise other processing steps, such as a step of enrobing the laminar arrangement of the confectionery mass layers prior to the step of cooling. Other suitable steps will be readily apparent to those of ordinary skill in the art.

Additional features and advantages are described herein, and will be apparent from the following Detailed Description and the figures.

BRIEF DESCRIPTION OF THE FIGURES

Specific embodiments of the invention will now be described, by way of example only, with reference to the accompanying drawings in which:

FIG. 1 is a schematic cross-sectional view of a first confectionery product according to the invention;

FIGS. 2A and 2B are perspective views of moulding equipment used for producing the first confectionery product shown in FIG. 1;

DETAILED DESCRIPTION

Figure 3:
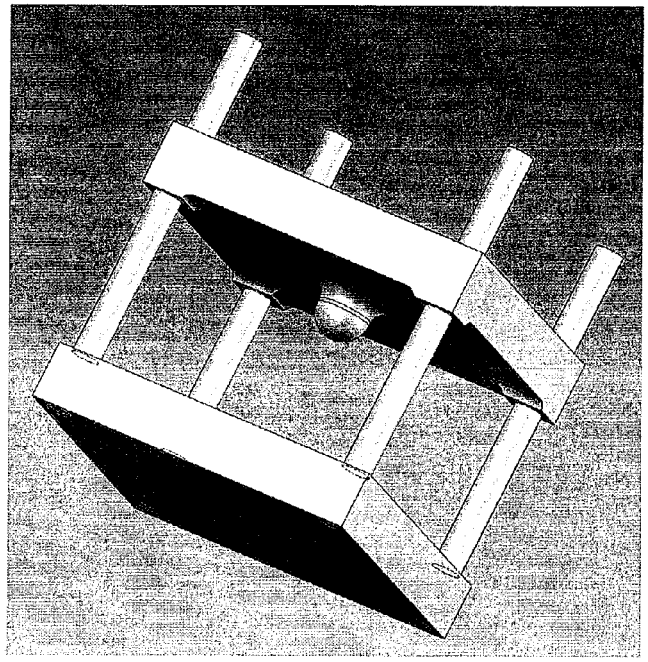
FIG. 3 is a perspective view illustrating use of the equipment shown in FIGS. 2A and 2B.

The invention provides a confectionery product comprising first and second confectionery mass layers arranged in contact with each other as a laminate. At least one of the inner surfaces of the first and second confectionery mass layers is provided with at least one depression. The inner surfaces of the confectionery mass layers define at least one pocket in the confectionery product, the or each pocket being located in an area corresponding to a respective depression. The invention also provides a method for producing the product.

With reference to FIG. 1, a first confectionery product 1 according to the invention comprises a first layer 3 of a confectionery mass and a second layer 5 of a confectionery mass. The first and second layers 3, 5 are arranged with respective inner surfaces 7, 9 contacting each other in a laminar arrangement.

The confectionery masses of the first and second layers 3, 5 are high-boiled toffee-flavoured sugar masses, and the contacting inner surfaces 7, 9 are effectively stuck to each other as a result of the inherent "stickiness" of the layers 3, 5. A suitable recipe for the sugar mass includes the following ingredients:

from 70 to 90 wt % of sugars;
from 10 to 20 wt % of dairy products (butter, milk);
from 0.05 to 0.15 wt % of an emulsifier; and
from 0.01 to 0.05 wt % of salt.

Additionally, from 1 to 5% of sodium bicarbonate is added to the ingredients immediately before they are formed into the product 1. The sodium bicarbonate is added to the mixture to induce a degree of micro-scale aeration in the sugar mass. The sodium bicarbonate-induced aeration has been found to reduce the "tooth packing" characteristics of the end product 1. Suitable cooking parameters for the sugar mass will be readily apparent to those of ordinary skill in the art.

A central portion of the inner surface 7 of the first confectionery mass layer 3 is provided with a substantially semi-spherical-shaped depression 11 having a diameter of approximately 15 mm. The depression 11 and a substantially flat part of the inner surface 9 of the second confectionery mass layer 5 which faces the depression 11 together define a pocket of air 13 in the confectionery product 1.

The pocket of air 13 in the confectionery product 1 can be described as macro-scale aeration of the product 1. The pocket of air 13 is provided in a predetermined location in the product 1, and has a predetermined size and shape. The product 1 provides the consumer with a sensory experience which is cannot be achieved with conventional aerated confectionery products. Typically, the lower density of the product 1, compared to conventional products, provides a product having a lighter texture.

FIGS. 2A, 2B and 3 illustrate moulding equipment suitable for use in a method of producing the first confectionery product 1 according to the invention described above.

To produce the product 1, the sugar mass produced according to the above-described recipe is first heated to improve formability. The sugar mass is then rolled into a thin sheet from which the first and second layers 3, 5 are cut. The sheet may have a thickness of approximately 2 mm and the first and second layers 3, 5 may each be formed to be square in shape with side dimensions of approximately 50 mm.

The depression 11 is formed in the first layer 3 using stamp moulding equipment, components of which are illustrated in FIGS. 2A and 2B. FIG. 2A shows a female part of the moulding equipment, which part is provided with a depression of a similar shape to and slightly larger size from the depression to be formed in the first layer 3. FIG. 2B shows a male part of the moulding equipment, which part is provided with a protrusion having the same shape and size as the protrusion to be formed in the first layer 3. The male part of the moulding equipment is also provided with a square-shaped stop in each of the corners of the moulding surface for regulating its position in relation to the female part and maintaining the thickness of the sheet without tearing the protrusion away from the sheet.

FIG. 3 is a perspective view showing the assembled moulding equipment used to form the depression 11 in the first layer 1. The female and male parts of the moulding equipment are movable relative to each other along removable axial guide bars. In use, the first layer 3 is placed on the female part to cover the depression and the male part is moved along the guide bars until its protrusion deforms the first layer 3. The protrusion of the male part is gradually pushed into the first layer 1 until its travel is limited by the stops abutting the female part.

Once the depression 11 has been formed in the first layer 3, the first layer 3 is allowed to cool slightly before it is removed from the moulding equipment to maintain the protrusion. Then, the first layer 3 is placed on top of the heated second layer 5 against surface 7 to provide the laminar arrangement, and the layers are trimmed. The first and second layers 3, 5 stick together to seal air trapped in the depression 11 as an air pocket 13.

Once the laminar arrangement has been formed, the product 1 is allowed to cool before being enrobed and packaged for delivery to the consumer.

Figure 4A:
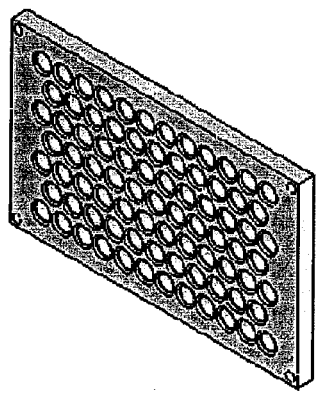
FIGS. 4A and 4B are perspective views of moulding equipment used for producing a second confectionery product according to the invention.
Figure 4B:
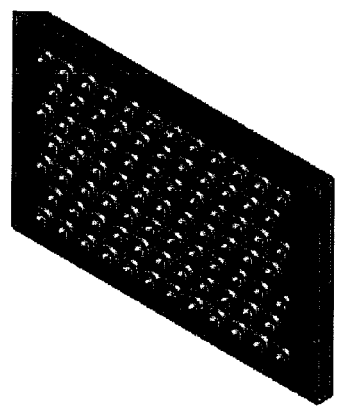
Figure 5:
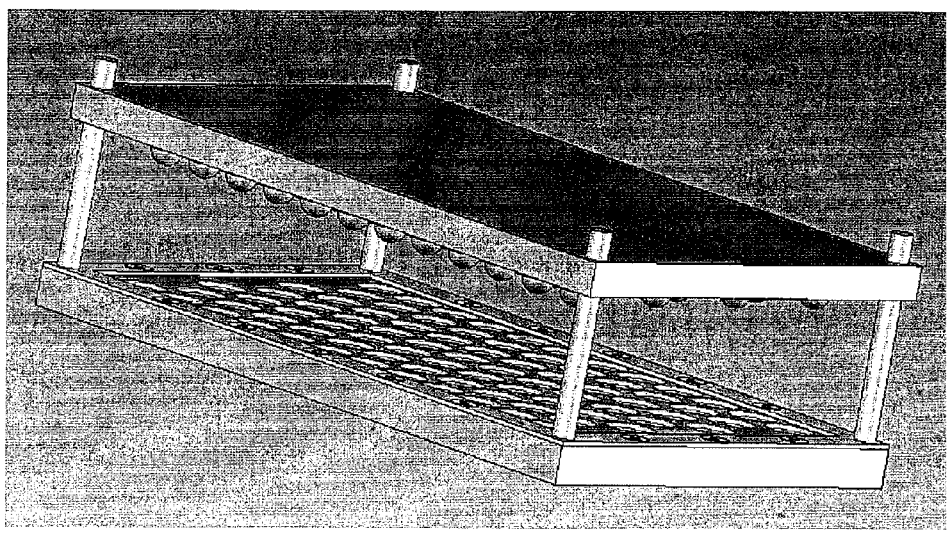
FIG. 5 is a perspective view illustrating use of the equipment shown in FIGS. 4A and 4B.

FIGS. 4A, 4B and 5 illustrate moulding equipment suitable for use in a method of producing a second confectionery product according to the invention described above. The second confectionery product is similar to the product 1 described above, except that the inner surface of the first layer is provided with a two-dimensional array of depressions. The arrangement of the array of depressions can be seen in FIGS. 4A and 4B.

The second product produced using the moulding equipment illustrated in FIGS. 4A, 4B and 5 may provide a different sensory experience to that of the first product 1 described above. The second product may generally be produced with larger dimensions than the first product 1.

Figure 6:
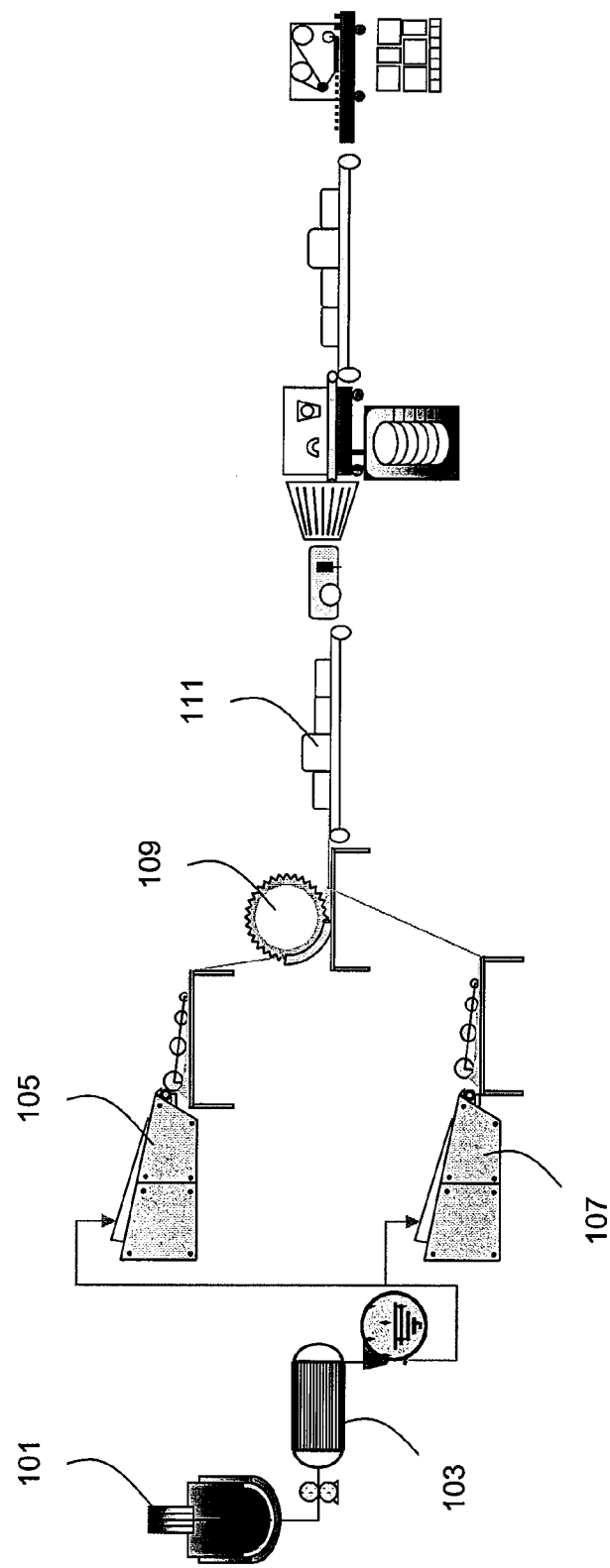
FIG. 6 is a schematic view of an industrial production line adapted for producing the second confectionery product according to the invention.

FIG. 6 is a schematic view of a continuous process line adapted for producing the second confectionery product described above.

With reference to FIG. 6, the process starts with the step of producing the sugar mass in a syrup cooker 101. The operation of the syrup cooker 101 will be readily apparent those of ordinary skill in the art.

The sugar mass produced in the syrup cooker 101 is provided to a cooling drum 103, which cools the sugar mass to a temperature at which it can be formed into shapes, which temperature is higher than room temperature.

Once the sugar mass has been cooled sufficiently in the cooling drum 103, it is passed, in parallel, to a pair of batch formers 105, 107. The batch formers maintain the sugar mass at the forming temperature, form the sugar mass into sheets and regulate the thickness of the sheets. The batch formers 105, 107 each provide one of the first and second layers of the second product described above.

One of the batch formers 105 feeds the first layer into a vacuum-assisted drop roll former 109 to form the array of depressions in a surface of the layer. The drop roll former 109 comprises a drum-shaped former having a continuous array of depressions formed on its outer surface. The first layer is urged against the drum to form the depressions therein. The layers are then brought together to form the laminar structure, with the depressions defining an array of air pockets.

The product is then passed through a cooling tunnel 111 to stabilize the air pockets before proceeding through conventional confectionery finishing steps including cutting, crimping, spreading, guillotine cutting, bottoming, enrobing, cooling and packaging.

Specific embodiments of the invention have been described above. Various changes may be made without departing from the scope of the invention. Such changes will be readily apparent to those of ordinary skill in the art.

For example, the air pockets may be partially or completely filled with solid, semi-solid or liquid materials. Where an array of air pockets is provided, the positioning of the air pockets may be varied, for example to improve the aesthetic appearance of the product.

More than two layers may be provided, and these layers may each be provided with depressions so that multiple air pockets extend in the thickness direction of the product. In this way, a three dimensional array of air pockets may be provided.

The depressions could be formed in the first layer by laminating an apertured layer and a continuous layer to provide the first layer. The apertures of the apertured layer would then define the side walls of the depressions. Other techniques for forming the depressions will be readily apparent.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A confectionery product comprising:
    first and second confectionery mass layers arranged in contact with each other as a laminate, each of the first and second confectionery mass layers having an inner surface facing the other confectionery mass layer, at least one of the inner surfaces of the first and second confectionery mass layers is provided with at least one depression, the inner surfaces of the confectionery mass layers define at least one air pocket in the confectionery product, the at least one air pocket being defined by the at least one depression in the inner surface of at least one of the first confectionery mass layer or the second confectionery mass layer and further defined by the inner surface of the other confectionery mass layer, wherein the first and second confectionery mass layers comprise at least one substance selected from the group consisting of high-boiled sugar masses, taffy masses, fruit leathers, caramels, nougats and combinations thereof.

2. The confectionery product according to claim 1, wherein the first and second confectionery mass layers consist of the same ingredients.

3. The confectionery product according to claim 1, wherein the first and second confectionery mass layers comprise a high-boiled toffee-flavoured sugar mass comprising from 70 to 90 wt % of sugars, from 10 to 20 wt % of dairy products, from 0.05 to 0.15 wt % of an emulsifier, and from 0.01 to 0.05 wt % of salt.

4. The confectionery product according to claim 1, wherein the first and second confectionery mass layers include sodium bicarbonate-induced aeration.

5. The confectionery product according to claim 1, wherein the pocket is at least partially filled with a material selected from the group consisting of liquid, semi-solid and solid material.

6. The confectionery product according to claim 1, wherein the inner surfaces of the first and second confectionery mass layers define a plurality of pockets in the confectionery product arranged in a regular, two-dimensional array.

7. The confectionery product according to claim 6, wherein the plurality of depressions define an area comprising at least 40% of the total area of the layers of the first and second confectionery mass layers in which the depressions are formed.

8. The confectionery product according to claim 6, wherein depressions are formed only in one of the inner layers of the first and second confectionery mass layers.

9. The method of producing a confectionery product, the method comprising the steps of:
   providing first and second confectionery mass layers each comprising at least one substance selected from the group consisting of high-boiled sugar masses, taffy masses, fruit leathers, caramels, nougats and combinations thereof;
   forming at least one depression in at least one surface of the first and second confectionery mass layers; and
   joining the first and second confectionery mass layers together in a laminar arrangement, such that the at least one depression is arranged in an inner surface of the first and second confectionery mass layers, the inner surfaces of the first and second confectionery mass layers defining at least one air pocket in the confectionery product, and the at least one air pocket being defined by the at least one depression in the inner surface of at least one of the first confectionery mass layer or the second confectionery mass layer and further defined by the inner surface of the other confectionery mass layer.

10. The method of producing a confectionery product according to claim 9, wherein the step of providing the first and second confectionery mass layers comprises heating at least one of the first and second confectionery mass layers.

11. The method of producing a confectionery product according to claim 10, comprising the step of cooling the laminar arrangement.

12. The method of producing a confectionery product according to claim 9, wherein the step of providing the first and second confectionery mass layers comprises inducing aeration in at least one of the first and second confectionery layers using from 1 to 5 wt % of sodium bicarbonate.

13. The method of producing a confectionery product according to claim 9, wherein the step of providing first and second confectionery mass layers comprises forming at least one of the first and second confectionery mass layers into sheets.

14. The method of producing a confectionery product according to claim 9, wherein the step of forming at least one depression in at least one surface of the first and second confectionery mass layers comprises forming the depression using a method selected from the group consisting of stamp moulding, drop-roll forming, vacuum-assisted drop roll forming and vacuum moulding.

15. The method of producing a confectionery product according to claim 9, wherein the forming of the at least one depression arranges a plurality of depressions in predetermined locations, the plurality of depressions having predetermined dimensions and volumes.

16. The method of producing a confectionery product according to claim 9, wherein the at least one depression in the inner surface of at least one of the first confectionery mass layer or the second confectionery mass layer comprises at least one depression in the inner surface of the first confectionery mass layer and at least one depression in the inner surface of the second confectionery mass layer that define the at least one air pocket.

17. The method of producing a confectionery product according to claim 9, wherein each of the first and second confectionery mass layers comprise a high-boiled toffee-flavoured sugar mass comprising from 70 to 90 wt % of sugars, from 10 to 20 wt % of dairy products, from 0.05 to 0.15 wt % of an emulsifier, and from 0.01 to 0.05 wt % of salt.

\* \* \* \* \*